# 2,870,137

WATER-INSOLUBLE MONOAZO DYESTUFFS

Ernest Merian, Bottmingen, near Basel, Bruno J. R. Nicolaus, Basel, and Walter Wehrli, Riehen, Switzerland, assignors to Sandoz A. G., Basel, Switzerland, a Swiss firm No Drawing. Application April 22, 1957
Serial No. 654,078

Claims priority, application Switzerland April 27, 1956

7 Claims. (Cl. 260—207)

The present invention relates to new water-insoluble monoazo dyestuffs which correspond to the general formula

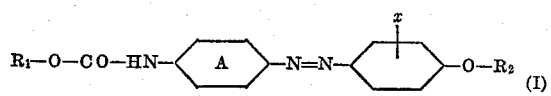

wherein:

$R_1$ stands for an alkyl, cycloalkyl, aralkyl or aryl radical which may bear non-ionic substituents,
$R_2$ stands for a lower alkyl or a carboxylic acid acyl radical which may bear non-ionic substituents,
$x$ stands for hydrogen, hydroxy, alkyl, alkoxy, alkanoylamino or alkyl sulfonylamino, and the nucleus A may be further substituted by non-ionic substitutents.

The process for the production of the new water-insoluble monoazo dyestuffs consists in reacting a monoazo dyestuff of the general formula

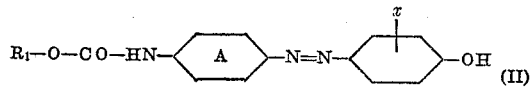

wherein A, $R_1$ and $x$ have the above-defined meanings, with an acylating or alkylating agent.

Another operative procedure consists in reacting 1 mol of an aminomonoazo compound of the general formula

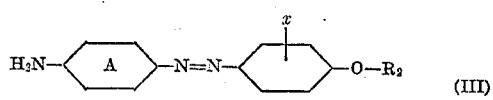

wherein A, $R_2$ and $x$ have the above-defined meanings with 1 mol of a chloroformic acid ester.

The alkyl, cycloalkyl, aralkyl or aryl radical denoted by $R_1$ in Formula I may more specifically represent a branched or an unbranched alkyl radical with 1 to 6 carbon atoms and which may contain hydroxy groups, ether groups and/or secondary amino groups, an alkyl radical substituted by aryl, aryloxy or a hetero-ring and having in all not more than 11 carbon atoms, or a phenyl radical which may be substituted by halogen atoms and/or methyl, methoxy, ethoxy, dimethylamino or diethylamino groups.

The nucleus A may within the present definition contain further substituents as for example hydroxy, methyl, ethyl, methoxy, ethoxy, alkylsulfonyl and/or alkylaminosulfonyl groups.

When the radical represented by $R_2$ in Formula I stands for a carboxylic acid acyl radical, it may be the radical of acetyl, propionyl, butyryl, isobutyryl, methoxyacetyl, ethoxyacetyl, 2-methoxypropionyl, 2-ethoxypropionyl, 3-methoxybutyryl, 3-ethoxybutyryl or benzoyl. When it stands for a lower alkyl radical it may be the radical of methyl, ethyl, propyl, isopropyl, butyl, isobutyl or 2-cyanoethyl.

The aminomonoazo compounds III used as starting materials in the second operating procedure of the process can be obtained, for example, by the reduction of nitro compounds of the general formula

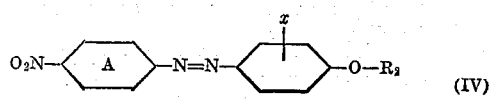

wherein A, $R_2$ and $x$ have the aforenamed meanings, or by coupling the diazo compound of 4-amino-1-hydroxybenzene derivatives etherified or esterified on the hydroxy group and having the general formula

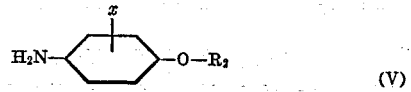

wherein $R_2$ and $x$ have the aforenamed meanings, with aminobenzene derivatives of the general formula

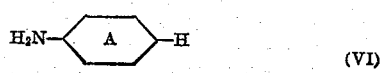

wherein A has the aforenamed meaning.

The reaction of the monoazo dyestuff (II) with the acylating or alkylating agents according to the first operating procedure and the reaction of the aminomonoazo Compound III with the chloroformic acid esters according to the second operating procedure of the process are conducted advantageously in solution (for example in an indifferent organic solvent) or in a very fine aqueous suspension or solution, preferably in the presence of a proton acceptor. The reaction temperature can vary within wide limits according to the procedure adopted.

The dyestuffs are isolated by one of the standard basic operations such as filtration, evaporation of the solvent or precipitation from the solvent with a suitable agent.

The new water-insoluble monoazo dyestuffs dye cellulose ester fibers, e. g. acetate and triacetate, polyvinyl fibers, synthetic polyamide fibers, e. g. nylon, "Perlon" (registered trade name) and terephthalic acid ester fibers, e. g. "Terylene," "Dacron" (registered trade names) in yellow to orange shades. They possess a good affinity for these fibers from aqueous suspensions, preferably in the presence of compounds with dispersing action and at elevated temperature. In some instances the affinity can be further improved by using mixtures of two or more dyestuffs of the general Formula I. Certain of them are also well suited for dyeing spinning solutions of cellulose acetate, cellulose triacetate, polyvinyl and polyacrylonitrile. The dyeings obtained from aqueous suspensions as well as the spun filaments dyed in the dope are dischargeable and possess excellent fastness to light, washing and chlorine in alkaline and, in some instances, in acid medium. They show also good fastness to alkali, acids, sublimation, cross-dyeing, perspiration, gas fumes and peroxide bleaching. Certain of the new dyestuffs are suitable for coloring lacquers, oils and synthetic resins. A number of them also dye wool, silk and polyacrylonitrile fibers, e. g. "Dynel," "Orlon," "Acrilan" (registered trade names).

The water-insoluble monoazo dyestuffs which are particularly suitable for dyeing cellulose acetate from aqueous suspension or in the spinning solution correspond to the general formula

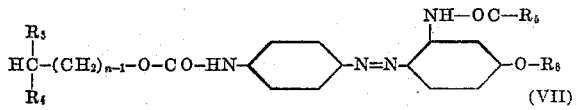
(VII)

wherein:

$R_3$ denotes hydrogen or a lower branched or unbranched alkyl radical, $R_4$ denotes hydrogen, hydroxy, alkoxy, dialkylamino or a lower alkyl radical, $R_5$ denotes an alkyl radical containing from 1 to 4 carbon atoms, $R_6$ denotes an alkanoyl radical containing between 2 and 4 carbon atoms or a methyl, ethyl or hydroxyethyl radical, and $n$ stands for one of the integers 1, 2, 3, 4, 5 and 6.

In the following examples all parts and percentages are by weight; the temperatures are given in degrees centigrade and the melting points are uncorrected.

EXAMPLE 1

40 parts of 1-(2'-acetylamino-4'-hydroxy)-phenylazo-phenyl-4-carbamic acid-(3"-methoxy)-butyl ester (melting point 208–209°) are finely pulverized and dissolved in 200 parts of pure pyridine with exclusion of moisture. 9 parts of acetyl chloride are added dropwise to the reaction mass at 10° with vigorous stirring. Stirring is continued for 2 hours at room temperature and for a further 4 hours at 75°.

At this point the mixture is acidified. The precipitated dyestuff is filtered off and the filter cake washed with water until it shows a pH value of 7, whereupon it is dried. A good yield is obtained of the resulting 1 - (2' - acetylamino - 4' - acetoxy) - phenylazo - phenyl-4-carbamic acid-(3"-methoxy)-butyl ester. The new product crystallizes out from alcohol in the form of beautiful red needles with a melting point at 132–133°. It dissolves in acetic ester with a greenish yellow coloration and in sulfuric acid with an orange coloration. The dyestuff dyes cellulose acetate, cellulose triacetate and polyamide fibers in yellow shades of excellent fastness to washing and sea water. The dyeings are dischargeable, fast to sublimation, gas fumes, peroxide bleaching and chlorine bleaching, and very fast to light. The solubility of this new monoazo dyestuff in acetone is 70 gm. per liter.

A dyebath is prepared with 0.6 part of the dyestuff obtained as described in the first section of the present example and dispersed with Turkey red oil, 6 parts of a sulfonated fatty alcohol and 3000 parts of water. 100 parts of cellulose acetate are immersed in the dyebath at room temperature, which is then heated to 80° in the course of 1 hour and held at this temperature for a further hour. After this time the dyeing process is completed. The goods are removed, rinsed and dried.

In order to improve the dispersion the dyestuff can be previously ground with suitable wetting, dispersing or emulsifying agents, preferably in the presence of an inorganic salt such as Glauber's salt. Alternatively, an aqueous paste of the dyestuff can be prepared and intimately mixed with a dispersing agent, the mixture then being suitably dried to give a dyestuff powder.

EXAMPLE 2

40 parts of 1-(2'-acetylamino-4'-hydroxy)-phenylazophenyl-4-carbamic acid-3"-methoxy)-butyl ester (melting point 208–209°) are finely pulverized and dissolved in a solution of 12 parts of sodium hydroxide in 200 parts of water at 10–20°. 14 parts of dimethyl sulfate are added to the reaction mass in three portions with thorough stirring. After some time the reaction is completed. The precipitated dyestuff is filtered off; the filter cake is washed with water until it shows a pH value of 7, and then dried. A good yield is obtained of the resulting 1-(2'-acetylamino-4'-methoxy)-phenylazo-phenyl - 4 - carbamic acid - (3"-methoxy)-butylester. The new product crystallizes out from alcohol as bright yellow needles with a melting point at 147–148°. It dissolves in acetic ester with a greenish yellow coloration and in sulfuric acid with an orange coloration. The dyestuff dyes cellulose acetate and triacetate and polyamide fibers in yellow shades of excellent fastness to washing and sea water. The dyeings are dischargeable, fast to sublimation, gas fumes, peroxide bleaching and chlorine bleaching, and very fast to light. The solubility of the new monoazo dyestuff in acetone is 100 gm. per liter.

Other alkylating agents, e. g. the benzene- or 4-methylbenzene-1-sulfonic acid alkyl esters, and the alkyl halides, are also well suited for use in the process.

100 parts of cellulose acetate are run into 300 parts of solvent (93% acetone, 7% methanol), mixed for a short time and left overnight to swell. 0.5 part of the dyestuff of the present example is dissolved in 85 parts of the solvent by simple agitation, the solution then being added to the cellulose acetate solution. The spinning solution thus obtained is stirred in an open vessel until 60 parts of the solvent have evaporated. The dyed mass is pumped into the spinning machine and spun in the normal way; the dyed filament is ready for further processing.

In the following Table I further valuable disperse dyestuffs are described which can be produced by one of the procedures described above. They correspond to the general formula

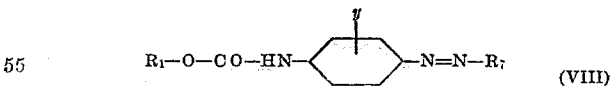
(VIII)

The meanings of $R_1$, $R_7$ and $y$ are recited in the appropriate columns; in another column the melting points are noted; in the penultimate and final columns respectively the shades of the dyeings on cellulose acetate and the acetone-solubility of the dyestuff in gm. per liter are recorded.

*Table I*

| Ex. No. | $y$ | $R_1$ | $R_7$ | M. P., degrees | Shade of dyeing on cellulose acetate | Solubility in acetone, gm. per liter |
|---|---|---|---|---|---|---|
| 3 | H | 3-methoxybutyl | 2'-propionyl-amino-4'-methoxyphenyl | 129 | Yellow | 65 |
| 4 | H | do | 2'-butyryl-amino-4'-methoxyphenyl | 125 | do | 100 |
| 5 | H | do | 2'-chloro-acetyl-4'-methoxyphenyl | 150 | do | 22 |
| 6 | H | Ethyl | 4'-methoxy-phenyl | 127 | do | 10 |
| 7 | H | do | 2'-hydroxy-4'-methoxyphenyl | 70 | do | 15 |

EXAMPLE 8

69 parts of 1-amino-4-ethoxybenzene are dissolved in 145 parts of hydrochloric acid 30% and 150 parts of water. The solution is ice-cooled to 0° and drop-fed with a solution of 35 parts of sodium nitrite in 100 parts of water. The resulting diazo solution is combined with 55 parts of 1-amino-3-hydroxybenzene in 500 parts of water and 30 parts of acetic acid. After the addition of 100 parts of sodium acetate the precipitated 4-ethoxy-2'-hydroxy-4'-amino-1.1'-azobenzene is filtered off. A dyestuff paste is obtained which is adjusted to 700 parts with water. Then 80 parts of sodium acetate and 150 parts of sodium chloride are stirred in. 600 parts of ice are added to give a freezing mixture, after which 70 parts of chloroformic acid ethoxyethylester are added slowly. The new dyestuff is filtered off and dried. It crystallizes out of ethanol in the form of small brown-red sticks with a melting point at 117° and dyes cellulose acetate and polyamide fibers in bright reddish yellow shades.

The following Table II contains further valuable water-insoluble monoazo dyestuffs which are obtainable acaccording to the details given in Examples 1, 2 or 8. They correspond to the general formula

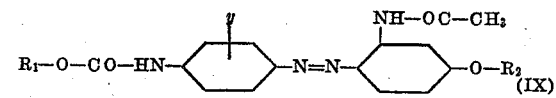

and are characterized in the table by the symbols $R_1$, $R_2$ and $y$ and by the shade of their dyeings on cellulose acetate.

Table II

| Ex. No. | y | $R_1$ | $R_2$ | Shade of dyeing on cellulose acetate |
|---|---|---|---|---|
| 9 | H | 2-methoxyethyl | Methyl | Yellow. |
| 10 | H | 2-ethoxyethyl | do | Do. |
| 11 | H | 3-methoxypropyl | do | Do. |
| 12 | H | 2-methoxypropyl | do | Do. |
| 13 | H | 2-ethoxypropyl | do | Do. |
| 14 | H | 4-methoxybutyl | do | Do. |
| 15 | H | 2-methoxyethyl | Ethyl | Do. |
| 16 | H | 2-ethoxyethyl | do | Do. |
| 17 | H | 3-methoxybutyl | do | Do. |
| 18 | H | do | n-Propyl | Do. |
| 19 | H | do | Isopropyl | Do. |
| 20 | H | do | 2-cyanoethyl | Do. |
| 21 | H | do | n-Butyl | Do. |
| 22 | H | do | Isobutyl | Do. |
| 23 | H | 2-ethoxyethyl | Propionyl | Do. |
| 24 | H | do | Butyryl | Do. |
| 25 | H | do | Isobutyryl | Do. |
| 26 | H | do | Benzoyl | Do. |
| 27 | H | do | 2-ethoxypropionyl | Do. |
| 28 | H | do | 3-ethoxybutyryl | Do. |
| 29 | H | do | Ethoxyacetyl | Do. |
| 30 | H | do | Methoxyacetyl | Do. |
| 31 | H | do | 3-methoxybutyryl | Do. |
| 32 | H | do | 2-methoxypropionyl | Do. |
| 33 | H | Phenyl | Methyl | Do. |
| 34 | 2-methyl | do | do | Do. |
| 35 | H | 4-methylphenyl | do | Do. |
| 36 | H | 3-methoxyphenyl | do | Do. |
| 37 | H | 4-ethoxyphenyl | do | Do. |
| 38 | H | 4-dimethylaminophenyl | do | Do. |
| 39 | H | 4-diethylaminophenyl | do | Do. |
| 40 | H | 2-morpholylethyl | do | Do. |
| 41 | H | 2-phenoxyethyl | do | Do. |
| 42 | H | 2-phenylethyl | do | Do. |
| 43 | H | Benzyl | do | Do. |
| 44 | H | 2-hydroxyethyl | do | Do. |
| 45 | H | 3-hydroxypropyl | do | Do. |
| 46 | H | 2-dimethylaminoethyl | do | Do. |
| 47 | H | 2-diethylaminoethyl | do | Do. |
| 48 | 2-methyl | 3-methoxybutyl | do | Do. |
| 49 | 2-methoxy | do | do | Do. |
| 50 | 2-ethoxy | do | do | Do. |
| 51 | 2-methylsulfonyl | do | do | Do. |
| 52 | 2-methylaminosulfonyl | do | do | Do. |
| 53 | H | Methyl | do | Do. |
| 54 | H | Isobutyl | do | Do. |
| 55 | H | n-Pentyl | do | Do. |
| 56 | H | Isopentyl | do | Do. |
| 57 | H | 2-ethylbutyl | do | Do. |
| 58 | H | n-Hexyl | do | Do. |
| 59 | H | 1-ethylpentyl | do | Do. |
| 60 | H | 2-ethylhexyl | do | Do. |
| 61 | H | n-Octyl | do | Do. |
| 62 | 2-aminosulfonyl | 3-methoxybutyl | do | Do. |
| 63 | 2-ethylaminosulfonyl | do | do | Do. |
| 64 | 2-(2'-hydroxy)-ethylaminosulfonyl | do | do | Do. |
| 65 | 2-(3'-methoxy)-propylaminosulfonyl | do | do | Do. |
| 66 | H | do | 4-methylbenzoyl | Do. |
| 67 | H | do | 4-chlorobenzoyl | Do. |
| 68 | 2-ethyl | do | Methyl | Do. |
| 69 | H | Isopropyl | do | Do. |
| 70 | H | n-Butyl | do | Do. |
| 71 | H | n-Propyl | do | Do. |

In the following Table III are enumerated water-insoluble monoazo dyestuffs obtainable according to the details given in the Examples 1, 2 or 8. They correspond to the Formula VIII and are characterized in the table by the symbols $R_1$, $R_7$ and $y$ and by the shade of their dyeings on cellulose acetate.

Table III

| Ex. No. | $y$ | $R_1$ | $R_7$ | Shade of dyeing on cellulose acetate |
|---|---|---|---|---|
| 72 | H | n-Propyl | 2'-propionylamino-4'-acetoxyphenyl | Yellow. |
| 73 | H | Ethyl | 2'-n-butyrylamino-4'-acetoxyphenyl | Do. |
| 74 | H | do | 2'-isobutyrylamino-4'-acetoxyphenyl | Do. |
| 75 | 2-methyl | Isopropyl | 2'-propionylamino-4'-propionoxyphenyl | Do. |
| 76 | do | n-Butyl | 2'-acetylamino-4'-methoxyphenyl | Do. |
| 77 | H | 2-ethoxyethyl | 2'-propionylamino-4'-methoxyphenyl | Do. |
| 78 | H | 3-methoxypropyl | do | Do. |
| 79 | H | 3-methoxybutyl | 2'-methoxy-4'-acetoxyphenyl | Do. |
| 80 | H | do | 2'-ethoxy-4'-methoxyphenyl | Do. |
| 81 | 2-methyl | do | 2',4'-dimethoxyphenyl | Do. |
| 82 | H | do | 2'-methyl-4'-methoxyphenyl | Do. |
| 83 | H | do | 2'-ethyl-4'-methoxyphenyl | Do. |
| 84 | H | do | 2'-methylsulfonylamino-4'-methoxyphenyl | Do. |
| 85 | H | do | 2'-n-butylsulfonylamino-4'-methoxyphenyl | Do. |
| 86 | H | do | 3'-methyl-4'-methoxyphenyl | Do. |
| 87 | H | 2-ethoxyethyl | do | Do. |
| 88 | H | do | 2'-n-butoxy-4'-methoxyphenyl | Do. |
| 89 | H | do | 2'-isovalerylamino-4'-methoxyphenyl | Do. |
| 90 | 2-methyl | do | do | Do. |
| 91 | H | 3-methoxybutyl | do | Do. |

Representative dyestuffs of the foregoing examples correspond to the formulae

EXAMPLE 1

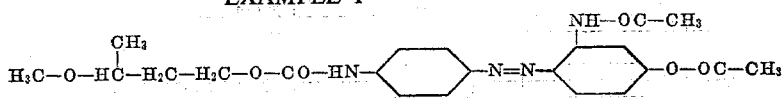

EXAMPLE 2

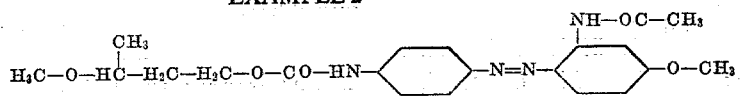

EXAMPLE 3

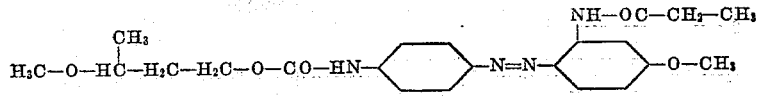

EXAMPLE 4

EXAMPLE 8

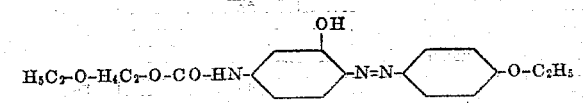

EXAMPLE 10

EXAMPLE 77

Having thus disclosed the invention what is claimed is:

1. A water-insoluble monoazo dyestuff which corresponds to the formula $$R_1—O—CO—HN—Ph_1—N=N—Ph_2—O—R_2$$

wherein $Ph_1$ represents a member selected from the group consisting of phenyl, hydroxyphenyl, methylphenyl, ethylphenyl, methoxyphenyl, ethoxyphenyl, methylsulfonylphenyl, methylaminosulfonylphenyl, ethylaminosulfonylphenyl, hydroxyethylaminosulfonylphenyl, methoxypropylaminosulfonylphenyl and aminosulfonylphenyl, $Ph_2$ represents a member selected from the group consisting of phenyl, hydroxyphenyl, methylphenyl, ethylphenyl, methoxyphenyl, ethoxyphenyl, alkanoylaminophenyl containing less than 6 carbon atoms in the alkanoyl group, and alkylsulfonylaminophenyl containing less than 5 carbon atoms in the alkyl group, $R_1$ represents a member selected from the group consisting of alkyl containing less than 9 carbon atoms, hydroxyalkyl containing less than 4 carbon atoms, alkoxyalkyl containing altogether less than 6 carbon atoms, dimethylaminoethyl, mononuclear aryl, mononuclear aryloxyethyl, morpholylethyl, benzyl and phenylethyl, and $R_2$ represents a member selected from the group consisting of cyanoethyl, alkyl containing less than 5 carbon atoms, alkanoyl containing less than 5 carbon atoms, alkoxyalkanoyl containing less than 7 carbon atoms and mononuclear arylcarbonyl, and wherein the groups $R_1$—O—CO—HN— and —O—$R_2$ are in para-position to the —N=N— group.

2. A water-insoluble monoazo dyestuff which corresponds to the formula

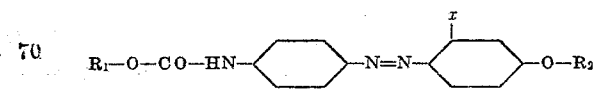

wherein:

$x$ represents an alkanoylamino radical containing less than 5 carbon atoms, $R_1$ represents an alkoxyalkyl radical containing altogether less than 6 carbon atoms, and
$R_2$ represents an akyl radical containing less than 5 carbon atoms.

3. The water-insoluble monoazo dyestuff which corresponds to the formula

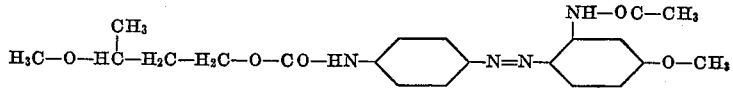

4. The water-insoluble monoazo dyestuff which corresponds to the formula

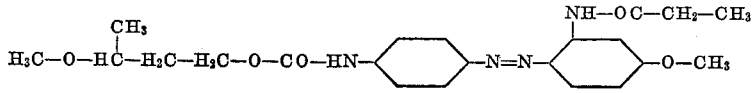

5. The water-insoluble monoazo dyestuff which corresponds to the formula

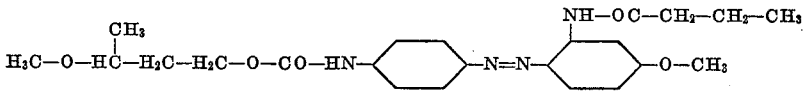

6. The water-insoluble monoazo dyestuff which corresponds to the formula

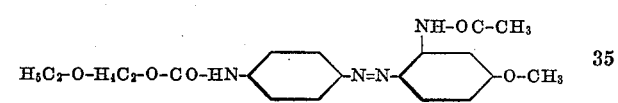

7. The water-insoluble monoazo dyestuff which corresponds to the formula

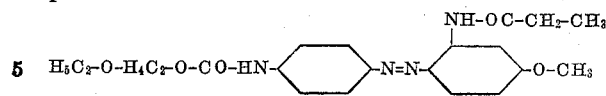

References Cited in the file of this patent
UNITED STATES PATENTS

| 1,735,960 | Dreyfus | Nov. 19, 1929 |

FOREIGN PATENTS

| 879,986 | France | Dec. 10, 1942 |